(12) United States Patent
Thorsen et al.

(10) Patent No.: US 12,004,527 B2
(45) Date of Patent: Jun. 11, 2024

(54) INFUSION PLANT

(71) Applicant: SPX FLOW TECHNOLOGY DANMARK A/S, Silkeborg (DK)

(72) Inventors: Knud Thorsen, Gjern (DK); Claus Riis, Silkeborg (DK); Gorm B. Kjaerulff, Silkeborg (DK); Ole Poulsen, Engesvang (DK); Claus Thorsen, Silkeborg (DK)

(73) Assignee: SPX Flow Technology Danmark A/S, Silkeborg (DK)

( * ) Notice: Subject to any disclaimer, the term of this patent is extended or adjusted under 35 U.S.C. 154(b) by 0 days.

(21) Appl. No.: 15/328,247

(22) PCT Filed: May 26, 2015

(86) PCT No.: PCT/DK2015/050130
§ 371 (c)(1),
(2) Date: Jan. 23, 2017

(87) PCT Pub. No.: WO2016/012026
PCT Pub. Date: Jan. 28, 2016

(65) Prior Publication Data
US 2017/0215446 A1    Aug. 3, 2017

(30) Foreign Application Priority Data
Jul. 25, 2014 (DK) .......................... PA 2014 00410

(51) Int. Cl.
*A23C 3/037* (2006.01)
*A23L 3/16* (2006.01)
(Continued)

(52) U.S. Cl.
CPC ................ *A23C 3/037* (2013.01); *A23L 3/16* (2013.01); *A23L 3/24* (2013.01); *G08B 21/18* (2013.01); *A23V 2002/00* (2013.01)

(58) Field of Classification Search
CPC ........ A23C 3/037; G02B 1/18; G06K 9/6202; H04N 7/183; A23L 3/16
See application file for complete search history.

(56) References Cited

U.S. PATENT DOCUMENTS 4,160,002 A * 7/1979 Janovtchik .............. A23L 3/225
99/453
4,398,867 A * 8/1983 Dernedde ............ B23K 33/006
415/136

(Continued)

FOREIGN PATENT DOCUMENTS

EP    0 794 706 A1    9/1997
EP    1 124 431 A1    8/2001
(Continued)

OTHER PUBLICATIONS

Database FSTA [Online]; International Food Information Service (IFIS), Frankfurtmain, Germany; 1979, G. Corrieu et al., "New monitoring equipment for the control and automatization of milk pasteurization plants," XP002775686, Database accession No. FS-1981-04-P-0649; & Food Process Engineering 1979, (see FSSTA (1981) 13 4D167). 1979 INRA, Lab. de Genie Ind., Villeneuve D'Ascq, France.

(Continued)

*Primary Examiner* — Reginald Alexander
(74) *Attorney, Agent, or Firm* — IceMiller LLP

(57) ABSTRACT

A plant for heat treating heat-sensitive fluid foodstuffs an infusion chamber in which the fluid foodstuff is subjected to a heat treatment by a feeding of steam, and a fluid foodstuff inlet connected to a plurality of openings at the top of the infusion chamber for creating a plurality of essentially downwardly directed separate fluid foodstuff jets. The infusion chamber has a bottom section configured to collect the fluid foodstuff from the jets. The bottom section has an outlet opening at the bottom of the infusion chamber for allowing (Continued)

the collected fluid foodstuff to exit the infusion chamber. The outlet opening is seamlessly connected to the inlet of a pump. A cooling jacket surrounds the bottom section for cooling the bottom section. The cooling jacket extends all the way down to the pump.

20 Claims, 2 Drawing Sheets

(51) Int. Cl.
    *A23L 3/24* (2006.01)
    *G08B 21/18* (2006.01)

(56) References Cited

U.S. PATENT DOCUMENTS

| | | | |
|---|---|---|---|
| 4,419,301 A | | 12/1983 | Nahra et al. |
| 4,608,006 A | * | 8/1986 | Rijpkema ............... A01J 25/15 |
| | | | 425/347 |
| 4,787,304 A | * | 11/1988 | Bronnert ............... A23L 3/22 |
| | | | 422/26 |
| 4,908,703 A | | 3/1990 | Jensen et al. |
| 5,087,464 A | | 2/1992 | Eberhardt et al. |
| 5,215,778 A | * | 6/1993 | Davison ............... A23G 9/34 |
| | | | 426/582 |
| 5,727,452 A | * | 3/1998 | Jensen ............... A23C 3/0375 |
| | | | 99/454 |
| 5,881,638 A | * | 3/1999 | Kjærulff ............... A23C 3/0375 |
| | | | 99/453 |
| 5,890,880 A | | 4/1999 | Lustwerk |
| 5,914,255 A | * | 6/1999 | Grae ............... A23L 3/005 |
| | | | 422/38 |
| 5,958,489 A | | 9/1999 | Chiappa |
| 6,391,356 B1 | | 5/2002 | Willcocks et al. |
| 7,222,726 B2 | | 5/2007 | Meade |
| 7,867,532 B2 | | 1/2011 | Freeman et al. |
| 8,511,226 B2 | | 8/2013 | Knorr et al. |
| 8,563,059 B2 | | 10/2013 | Luckhardt et al. |
| 9,131,707 B2 | | 9/2015 | Garwood |
| 9,324,227 B2 | | 4/2016 | Gettings et al. |
| 9,364,021 B2 | | 6/2016 | Taitler |
| 9,445,614 B2 | | 9/2016 | Storek et al. |
| 9,445,625 B2 | | 9/2016 | Burkett et al. |
| 9,538,880 B2 | | 1/2017 | Riefenstein |
| 9,730,542 B2 | | 8/2017 | Storek et al. |
| 9,886,631 B2 | | 2/2018 | Dante et al. |
| 2005/0123663 A1 | | 6/2005 | White et al. |
| 2006/0081135 A1 | | 4/2006 | Britton et al. |
| 2009/0217793 A1 | | 9/2009 | Spillner et al. |
| 2011/0117259 A1 | | 5/2011 | Storek et al. |
| 2011/0293797 A1 | | 12/2011 | Pryor et al. |
| 2012/0058355 A1 | | 3/2012 | Lee et al. |
| 2012/0287285 A1 | | 11/2012 | Jensen et al. |
| 2012/0312419 A1 | * | 12/2012 | Wagner ............... A23C 3/027 |
| | | | 141/11 |
| 2012/0321771 A1 | | 12/2012 | Kowalik et al. |
| 2013/0070080 A1 | | 3/2013 | Saucier et al. |
| 2013/0171304 A1 | | 7/2013 | Huntley |
| 2013/0302483 A1 | | 11/2013 | Riefenstein |
| 2014/0220197 A1 | | 8/2014 | Hocker et al. |
| 2014/0242239 A1 | | 8/2014 | Boggavarapu |
| 2014/0342061 A1 | | 11/2014 | Green et al. |
| 2015/0013546 A1 | | 1/2015 | Kastor |
| 2015/0056344 A1 | | 2/2015 | Luckhardt |
| 2015/0237908 A1 | | 8/2015 | Burkett et al. |
| 2015/0313268 A1 | | 11/2015 | Kafer et al. |

FOREIGN PATENT DOCUMENTS

| | | | |
|---|---|---|---|
| JP | 50-64803 | A | 6/1975 |
| JP | 10-509874 | A | 9/1998 |
| JP | 2013511691 | A | 4/2013 |
| WO | 96/16556 | A1 | 6/1996 |
| WO | 00/25596 | A1 | 5/2000 |
| WO | 02/060281 | A1 | 8/2002 |
| WO | 2014086487 | A1 | 6/2014 |

OTHER PUBLICATIONS

Peter M. Withers, "Ultrasonic, acoustic and optical techniques for the non-invasive detection of fouling in food processing equipment," Trends in Food Science & Technology, Sep. 1, 1996, pp. 293-298, XP055424906.

International Search Report issued in International Patent Application No. PCT/DK2015/050130 dated Oct. 12, 2015.

Written Opinion of the International Searching Authority in International Patent Application No. PCT/DK2015/050130 dated Oct. 16, 2015.

Anonymous: "Dairy Engineering: Lesson 2. Sanitary Pipes and Fitting, Glass, Plastic Tubing and Gaskets", Dairy Engineering, Sep. 21, 2012 (Sep. 21, 2012), pp. 1-3.

Anonymous: "What is the Difference Between Welded and Seamless Sanitary Tubing?", Holland Applied Technologies, Jan. 6, 2014 (Jan. 6, 2014), pp. 1-3.

Benjamn Valdez et al: "Corrosion in the Food Industry and Its Control" In: "Food Industrial Processes—Methods and Equipment", Feb. 22, 2012 (Feb. 22, 2012), InTech, XP055497046.

* cited by examiner

INFUSION PLANT

REFERENCE TO RELATED APPLICATIONS

This application is the U.S. national stage of International Application No. PCT/DK2015/050130, filed May 26, 2015, which claims priority to Danish Application No. PA 2014 00410, filed Jul. 25, 2014, the disclosures of which are incorporated herein by reference in their entirety.

TECHNICAL FIELD

The disclosure relates to a plant for ultra-high temperature treatment (UHT) of heat-sensitive fluid foodstuffs, such as whey protein concentrate, baby food, nutritious drinks and cheese milk, the plant comprising an infusion chamber in which the fluid is heat treated by way of supply of steam.

BACKGROUND

EP 0 794 706 discloses an infusion plant for high temperature treatment heat-sensitive fluid foodstuffs, such as whey protein concentrate and cheese milk. The plant has an infusion chamber, in which the fluid is subjected to a heat treatment by feeding steam. The food product is introduced at the top of the infusion chamber as a bundle of separate and mainly downwardly directed jets of foodstuff. The lower section of the infusion chamber serves to collect the foodstuff and has cooled walls using a cooling jacket. An outlet opening of the infusion chamber is arranged at the bottom of the infusion chamber and the outlet opening is connected to the inlet of a positive-displacement pump. The outlet of the positive-displacement pump is connected to the inlet of a vacuum chamber that serves to remove water from the food product that was added during the steam infusion.

The infusion plant uses high temperature for a short time to kill micro-organisms by steam infusion. This technology is widely used in the dairy industry where products can lose their nutritional value, flavor and appearance as micro-organisms multiply. These organisms thrive at certain temperatures but if they are not present in a product, the product can be stored for many months without the need for refrigeration. Steam infusion achieves this objective with minimal heat degradation compared with other UHT processes. It helps protect essential components such as vitamins and results in fresh tasting products with outstanding quality. It provides the necessary kill rate for commercial sterility and can handle a wide product viscosity range—covering fluids from milk, puddings, ice cream, baby food, condensed milk, processed cheese, sauces and creams to lotions.

In the known infusion plant a cooling jacket is provided around the bottom section of the infusion chamber for minimizing burn-on and fouling. However, fouling is not completely prevented and cleaning and/or rinsing of the infusion chamber is necessary after a given period of operation, depending e.g. on the type of foodstuff. It is though desirable to minimize fouling and to obtain longer running times between cleaning operations and thereby achieve better production efficiency. Also, a more predictable length of run time before cleaning is needed would be desirable. Overall, the market requests more efficient bacteria killing equipment to meet the increasingly demand to produce heat sensitive products like baby foods.

SUMMARY

It is an aspect of the disclosure to provide an infusion plant for ultra-high treatment of fluid foodstuffs with longer and/or more predictable running time between cleaning operations necessitated by fouling or burn-on.

This aspect is achieved according to a first aspect of the disclosure by providing a plant for heat treating heat-sensitive fluid foodstuffs, such as whey protein concentrate, baby food, baby food liquid concentrates, nutritious drinks or cheese milk, the plant comprising: an infusion chamber, in which the fluid foodstuff is subjected to a heat treatment by a feeding of steam, a fluid foodstuff inlet connected to a plurality of openings at the top of the infusion chamber for creating a plurality of essentially downwardly directed separate fluid foodstuff jets, the infusion chamber having a bottom section configured to collect the fluid foodstuff from the fluid foodstuff jets, the bottom section having an outlet opening at the bottom of the infusion chamber for allowing the collected fluid foodstuff to exit the infusion chamber, the outlet opening being seamlessly connected to the inlet of a pump, and a cooling jacket surrounding the bottom section for cooling the bottom section, the cooling jacket extending all the way down to the pump.

By providing a seamless transition between the bottom section and the pump and by providing cooling around the bottom section and all the way down to the pump fouling and burn-on is reduced and results in longer and safer production time between cleanings, which significantly increases production efficiency of the infusion heat treatment plant.

In a first possible implementation form of the first aspect the pump comprises a pump housing and the cooling jacket extends into the pump housing.

In a second possible implementation form of the first aspect the outlet is an integral part of the bottom section and the pump housing is integral with the outlet in order to obtain a seamless transition from the bottom section to the pump.

In a third possible implementation form of the first aspect the outlet of the bottom section is welded directly to the inlet of the pump housing to form a seamless transition.

In a fourth possible implementation form of the first aspect the bottom section has steel walls that are welded to an upwardly projecting flange or ridge of the pump housing.

In a fifth possible implementation form of the first aspect the plant further comprising a feed conduit for feeding cooling fluid to the cooling jacket and a return conduit for returning cooling fluid from the cooling jacket, a portion of the feed conduit extending through the pump housing and connecting to the cooling jacket at a location inside the pump housing.

In a sixth possible implementation form of the first aspect the pump is a positive displacement pump, preferably a gear pump or a lobe pump.

In a seventh possible implementation form of the first aspect the pump is a centrifugal pump.

In an eighth possible implementation form of the first aspect the bottom section is releasably connected to the upper section, e.g. by a flanged connection.

The foregoing and other aspects are achieved by the features of the independent claims. Further implementation forms are apparent from the dependent claims, the description and the figures.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION

Figure 1:
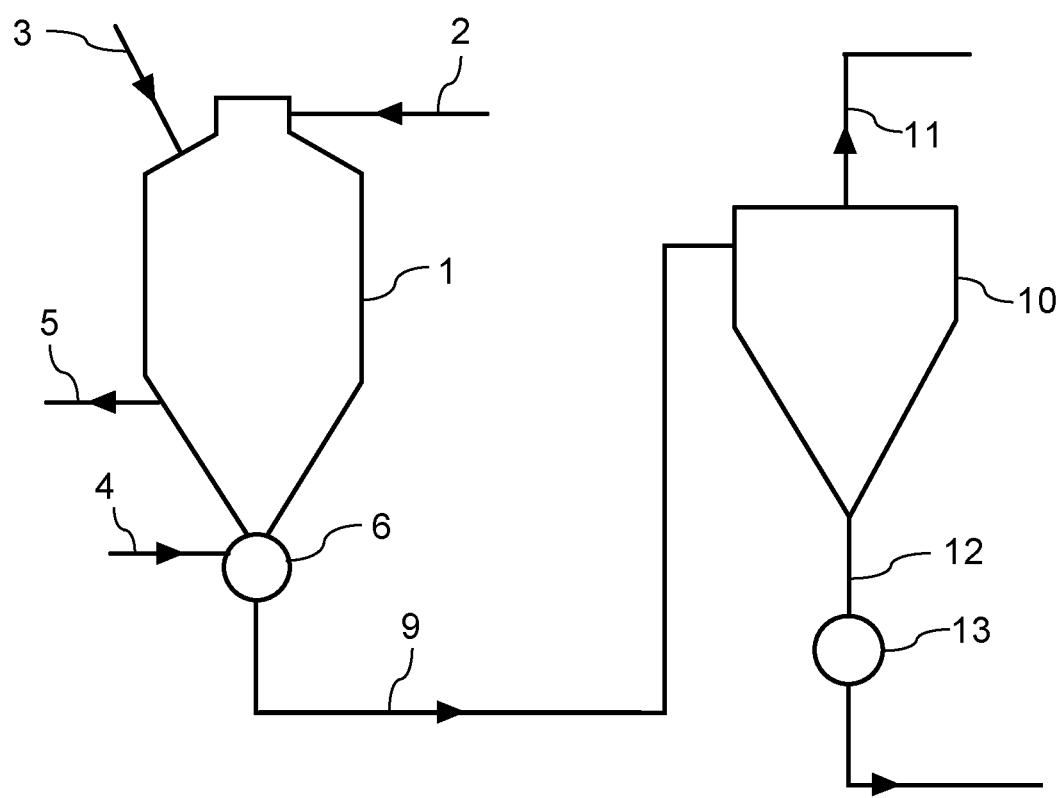
FIG. 1 is a diagrammatic view of an ultra-high temperature treatment plant.

FIG. 1 discloses a plant for ultra-high temperature treatment of liquid foodstuff. The liquid foodstuff can be any foodstuff in liquid form, but the disclosed plant is particularly useful for temperature sensitive foodstuffs that should be heated for killing bacteria for a short period only so as to preserve their flavor, consistency and nutritious qualities. Examples of such liquid foodstuffs are milk, baby food liquid, baby food liquid concentrate or nutritional drinks (with high protein content). The liquid foodstuff may have a high dry matter content (40% and higher) and/or high protein content (6% or higher).

The plant of FIG. 1 has an infusion chamber 1 of a conventionally known type. The infusion chamber 1 is connected to a tube 2 for feeding fluid foodstuff to be heat treated inside the infusion chamber 1, and a tube 3 for the feeding of steam. Finally, the infusion chamber is connected to tubes 4 and 5 for feeding and removing liquid for cooling the bottom of the infusion chamber 1. In an embodiment the cooling liquid is water. The outlet of the infusion chamber 1 directly connected with a pump 6. In an embodiment the pump 6 is a centrifugal pump. In another embodiment the pump 6 is a positive displacement pump, such as a lobe or gear pump. The outlet of the pump 6 is connected to the inlet of a vacuum chamber 10 of a conventionally known type through a tube 9. This vacuum chamber is adapted to remove the amount of water being supplied in form of steam in the infusion chamber through a tube 11, whereas the concentrated fluid foodstuff is drained off through a tube 12 and a pump 13 in a conventionally known manner.

Figure 2:
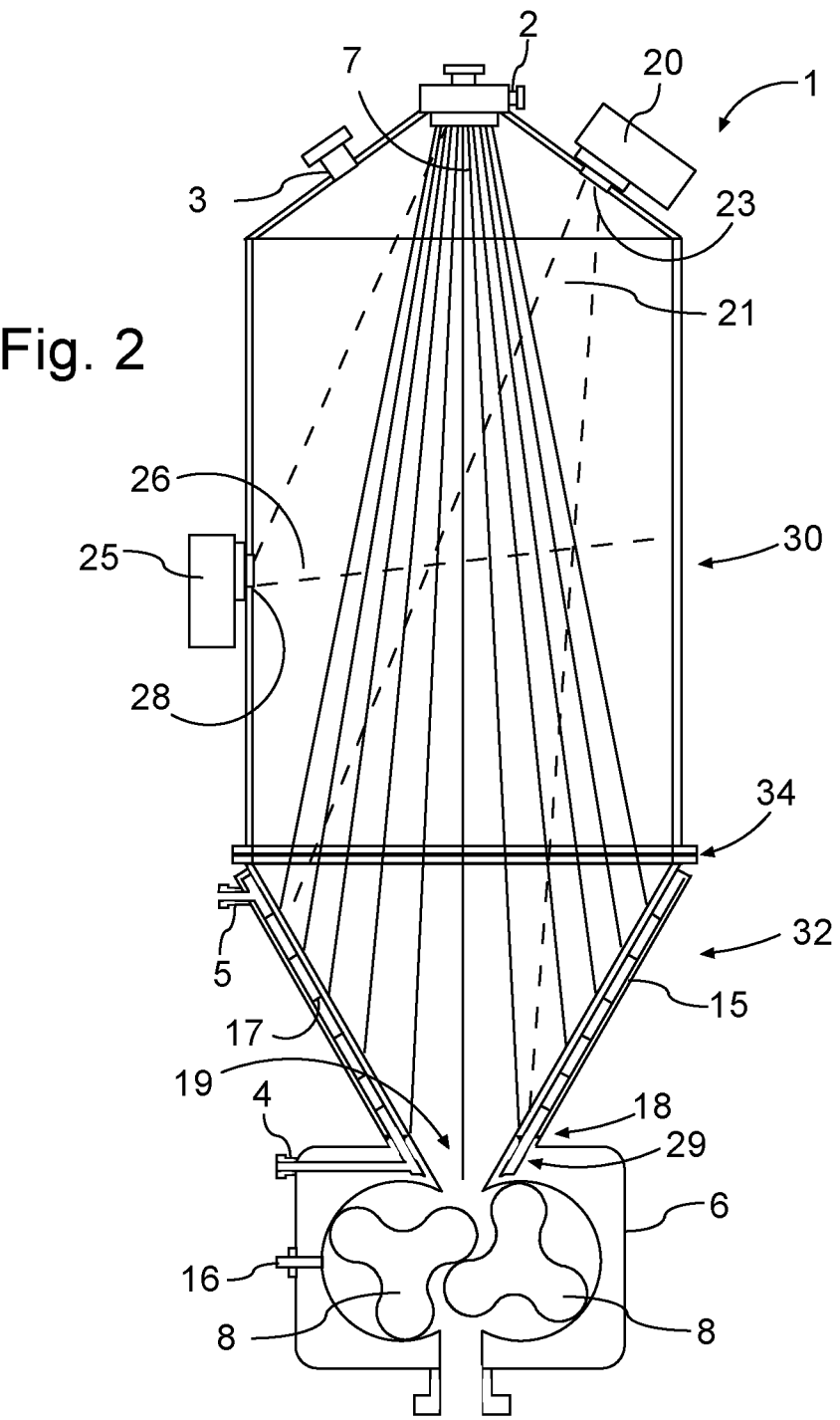
FIG. 2 is a sectional view of an infusion plant according to an example embodiment.

FIG. 2 is a diagrammatic sectional view of the infusion chamber. The infusion chamber is preferably essentially rotation symmetrical around a vertical axis. The upper section 30 of the infusion chamber has a hollow cylindrical part and a top part that is shaped similar to a conical frustum. A bottom section 32 is releasably connected to the upper section 30 by a flanged connection 34 for allowing access to the interior of the infusion chamber 1 for cleaning and/or maintenance. The bottom section 32 has in an embodiment a shape similar to a conical frustum. At the lower end of the infusion chamber there is an outlet opening 19 that is directly connected to the inlet of a lobe pump 6.

The fluid foodstuff to be treated is carried through the tube 2 into the infusion chamber 1. The fluid foodstuff enters the infusion chamber 1 as a bundle 7 of separate liquid foodstuff jets through a plurality of openings in a nozzle at the top of the infusion chamber 1. Hot steam is injected into the infusion chamber 1 through a circumferential steam distribution chamber in a well-known manner. In the infusion chamber 1 the liquid foodstuff jets meet the hot steam and the foodstuff is thereby heated and absorbs the steam.

The liquid foodstuff jets end on the funnel shaped inner wall of the bottom section 32. The bottom section 32 collects the liquid foodstuff from the liquid foodstuff jets and guides it to the outlet opening 19 at the lower end of the infusion chamber 1 (which is also the lower end of the bottom section 32 and which is also the inlet of the pump 6).

A cooling jacket 15 is provided around the bottom section 32. The cooling jacket 15 keeps the bottom section 32 cool, to prevent or minimize the liquid foodstuff that gets into contact with the inner walls of the bottom section 32 to foul or burn-on. The cooling jacket 15 provides for a mantle of cooling water or other cooling medium around the bottom section 32. The mantle is divided by a spiral traverse wall 17 that guides the cooling water in a spiral pattern around the bottom section 32. The inlet of the cooling water 4 passes though the pump housing and into a portion 29 of the mantle that extends also into the pump housing. From the portion 29 internal to the pump housing the spiral path of the cooling water continues spirally upwards towards the cooling medium outlet 5 at the top of the cooling jacket 15 and near the top of the bottom section 32.

The lower portion of the bottom section 32 forms the outlet opening 19 of the chamber that connects seamlessly to the inlet of the pump 6. This is in an embodiment achieved by the lower end of the bottom section 32 being made from steel plates, preferably stainless steel, and connected to the pump housing by welds 18. In an embodiment the pump housing is provided with a circular ridge or circular upright flange that facilitates welding of the pump housing to the lower end of the bottom section 32. After welding the transition between the bottom section 32 and the pump housing/pump inlet formed by the welds 18 is machined to provide a perfectly smooth surface without any cracks or fissures that could be difficult to clean or rinse.

The gear or lobe pump 6 is of a conventionally known type and is connected to the outlet 19 of the infusion chamber 1, and the housing of the gear or lobe pump 6 is provided with a temperature sensor 16 at a location where the adjacent surface is kept clean of burnings by means of the teeth of the gear wheels or by the lobes of the rotors 8. In this manner it is possible to ensure a reliable control of the plant.

In an example embodiment an optical camera 20, preferably a digital optical camera) is mounted on the infusion chamber 1 with an angle of view 21 covering at least a portion of the bottom section 32 so that an operator or a processor configured therefore can determine that fouling has occurred (or not) and cleaning needs to be performed (or not). The optical camera 20 is preferably mounted at or near top of the infusion chamber 1, pointing downwards towards the bottom section 32. The wall of the infusion chamber is in an embodiment provided with a sight glass 23 for allowing the optical camera 20 to view into the infusion chamber 1.

The sight glass 23 is preferably at least on its inner side facing the interior of the infusion chamber 1 provided with a coating to prevent formation of water droplets on the inner side.

In an embodiment, images from the optical camera 20 are processed by a processor (not shown) that is configured to detect changes in the image. The processor is further configured to issue a notification or alarm when it has determined that the image taken by the camera 20 has changed relative to an initial image taken shortly after the start of a production run.

Another optical camera 25 (preferably a digital optical camera) is mounted on the infusion chamber 1 with an angle of view 26 covering at least a portion of the bundle 7 of fluid foodstuff jets.

The optical camera 25 can be mounted at or near the bottom of the infusion chamber 1, pointing upwards towards the upper section 30.

The disclosure has been described in conjunction with various embodiments herein. However, other variations to the disclosed embodiments can be understood and effected by those skilled in the art in practicing the claims, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The reference signs used in the claims shall not be construed as limiting the scope. The mere fact that certain measures are recited in mutually different dependent claims does not indicate that a combination of these measured cannot be used to advantage. The reference signs used in the claims shall not be construed as limiting the scope.

The invention claimed is:

1. A plant for heat treating heat-sensitive fluid foodstuffs comprising:
    an infusion chamber, in which the fluid foodstuff is subjected to a heat treatment by a feeding of steam,
    a fluid foodstuff inlet connected to a plurality of openings at the top of said infusion chamber for creating a plurality of essentially downwardly directed separate fluid foodstuff jets,
    said infusion chamber having a bottom section configured to collect the fluid foodstuff from said fluid foodstuff jets,
    said bottom section having an outlet opening at the bottom of said infusion chamber for allowing said collected fluid foodstuff to exit said infusion chamber,
    a pump to pump the foodstuff from said outlet opening at said bottom of said infusion chamber, the pump having a top section and an inlet at the top section;
    said outlet opening being directly connected to the inlet of said pump without a seam, the pump including a pump housing, wherein the bottom section is defined by a conical sidewall extending to the outlet opening, wherein said outlet opening is part of said bottom section and wherein said pump housing is integrated into said bottom section so that said outlet opening is the inlet of the pump, wherein the transition from said bottom section to said pump is seamless, wherein said transition has a smooth surface without any cracks or fissures, and
    a continuous cooling jacket surrounding said bottom section for cooling said bottom section, said cooling jacket extending from said bottom section all the way down into said pump housing to cool both the bottom section and the top section of the pump, wherein the cooling jacket is configured to guide cooling water from the pump housing to said bottom section.

2. A plant according to claim 1, wherein the outlet of said bottom section is welded directly to the inlet of said pump housing to form a seamless transition.

3. A plant according to claim 2, wherein said bottom section has steel walls that are welded to an upwardly projecting flange or ridge of said pump housing.

4. A plant according to claim 1, further comprising a feed conduit for feeding cooling fluid to said cooling jacket and a return conduit for returning cooling fluid from said cooling jacket, a portion of said feed conduit extending through said pump housing and connecting to said cooling jacket at a location inside said pump housing.

5. A plant according to claim 1, wherein said pump is a positive displacement pump.

6. A plant according to claim 1, wherein said pump is a centrifugal pump.

7. A plant according to claim 1, wherein said bottom section is releasably connected to said upper section.

8. A plant according to claim 1, wherein said pump is a gear pump.

9. A plant according to claim 1, wherein said pump is a lobe pump.

10. A plant according to claim 1, wherein the cooling jacket comprises a spiral traverse wall that guides cooling water from the pump housing to said bottom section in a spiral pattern.

11. A plant for heat treating heat-sensitive fluid foodstuffs comprising:
    an infusion chamber, in which the fluid foodstuff is subjected to a heat treatment by a feeding of steam,
    a fluid foodstuff inlet connected to a plurality of openings at the top of said infusion chamber for creating a plurality of essentially downwardly directed separate fluid foodstuff jets,
    said infusion chamber having a bottom section configured to collect the fluid foodstuff from said fluid foodstuff jets,
    said bottom section having an outlet opening at the bottom of said infusion chamber for allowing said collected fluid foodstuff to exit said infusion chamber,
    a pump to pump the foodstuff from said outlet opening at said bottom of said infusion chamber, the pump having a pump housing, a top section, and an inlet in the top section;
    said bottom section being directly connected to the pump housing without a seam such that the outlet opening of said bottom section is the inlet of the pump, wherein the bottom section is defined by a conical sidewall extending to the outlet opening, wherein the transition from said bottom section to said pump is seamless, and
    a continuous cooling jacket surrounding said bottom section for cooling said bottom section, said cooling jacket extending from said bottom section all the way down into said top section of the pump housing to cool both the bottom section and the top section of the pump.

12. The plant according to claim 11, wherein the outlet of said bottom section is welded directly to the inlet of said pump housing to form a seamless transition.

13. A plant according to claim 12, wherein said bottom section has steel walls that are welded to an upwardly projecting flange or ridge of said pump housing.

14. A plant according to claim 11, further comprising a feed conduit for feeding cooling fluid to said cooling jacket and a return conduit for returning cooling fluid from said cooling jacket, a portion of said feed conduit extending through said pump housing and connecting to said cooling jacket at a location inside said pump housing.

15. A plant according to claim 11, wherein said pump is a positive displacement pump.

16. A plant according to claim 11, wherein said pump is a centrifugal pump.

17. A plant according to claim 11, wherein said bottom section is releasably connected to said upper section.

18. A plant according to claim 11, wherein said pump is a gear pump.

19. A plant according to claim 11, wherein said pump is a lobe pump.

20. A plant according to claim 11, wherein the cooling jacket comprises a spiral traverse wall that guides cooling water from the pump housing to said bottom section in a spiral pattern.

* * * * *